Figure 3:
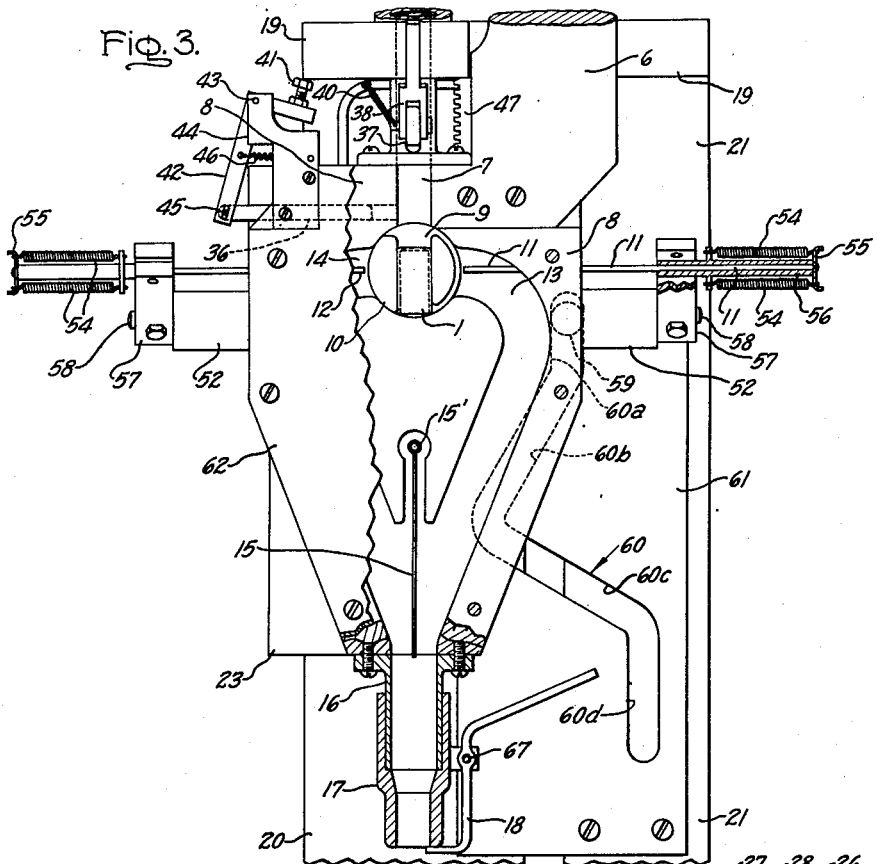

March 20, 1951
H. L. LOUDEN
2,545,888
ARTICLE FEEDING APPARATUS
Filed Dec. 2, 1947
2 Sheets-Sheet 1
Fig. 2.
Fig. 1.
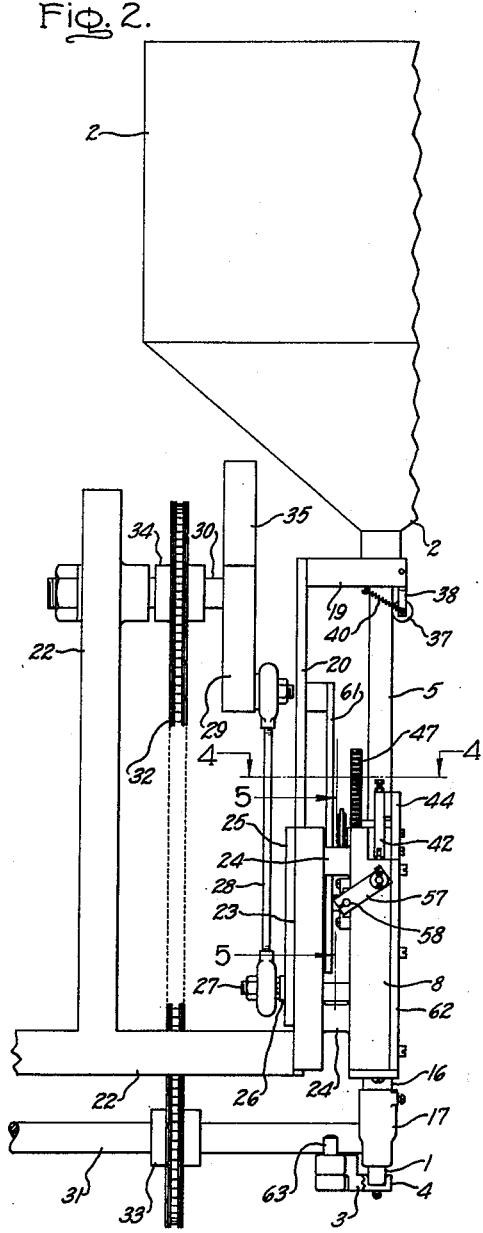
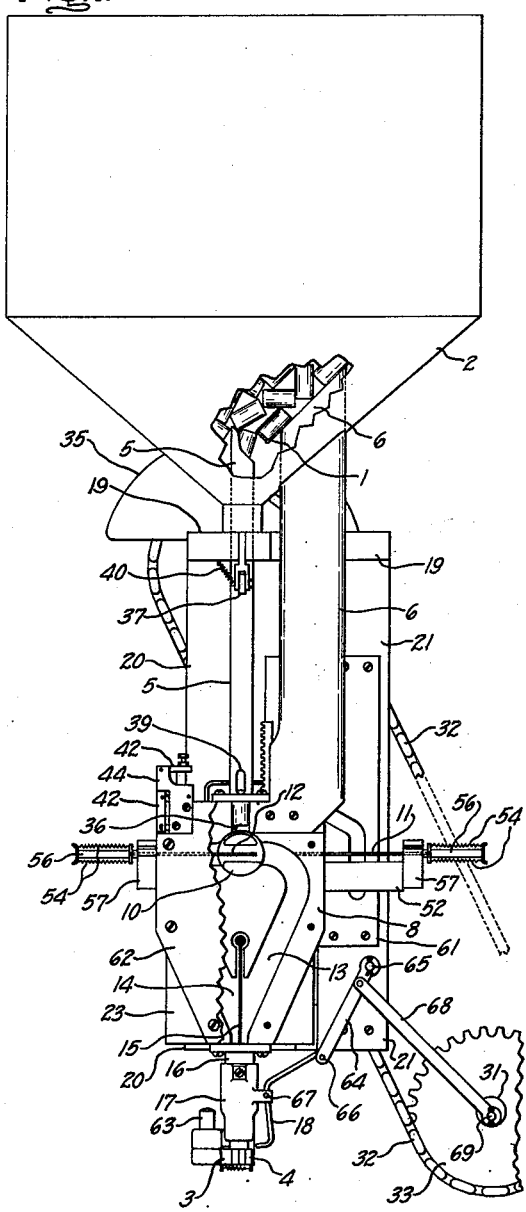
Inventor:
Harry L. Louden,
by Vernet C. Kauffman
His Attorney.

March 20, 1951

H. L. LOUDEN 2,545,888

ARTICLE FEEDING APPARATUS

Filed Dec. 2, 1947

2 Sheets-Sheet 2

Inventor:
Harry L. Louden,
by Vernet C. Kauffman
His Attorney.

Patented Mar. 20, 1951

2,545,888

UNITED STATES PATENT OFFICE 2,545,888

ARTICLE FEEDING APPARATUS

Harry L. Louden, Cleveland, Ohio, assignor to General Electric Company, a corporation of New York Application December 2, 1947, Serial No. 789,316

6 Claims. (Cl. 193—43)

My invention relates to feeding apparatus for hollow cylindrical articles which are closed at one end, and more particularly to feeding apparatus capable of selecting such articles from a disarranged grouping and delivering the articles in correspondingly orientated position. My apparatus is particularly suited to feed small cylindrical glass bulbs, such as those used in minature lamps and lamp control switches, to automatically operating machines.

In a preferred embodiment of the apparatus, a supply of disarranged cylindrical bulbs is provided in a funnel-shaped hopper and the operations thereof are such as to automatically advance single bulbs end-wise in succession through the central opening in the bottom of the hopper, to orientate said bulbs in a corresponding end-for-end relation and then to advance them to a receiving station of associated apparatus. The rate of operation of the apparatus is preferably caused to coincide with that of associated apparatus so as to cause the delivery of single bulbs at definite intervals in the operation thereof, and is controlled by driving the feeding apparatus from, and therefore in synchronism with, the main driving means of the associated apparatus. My feeding apparatus is particularly advantageous because of its simplicity, freedom from clogging and ability to operate satisfactorily for considerable periods of time.

Other objects and advantages of my invention will appear from the following detailed description of a species thereof and from the drawing.

Figure 5:
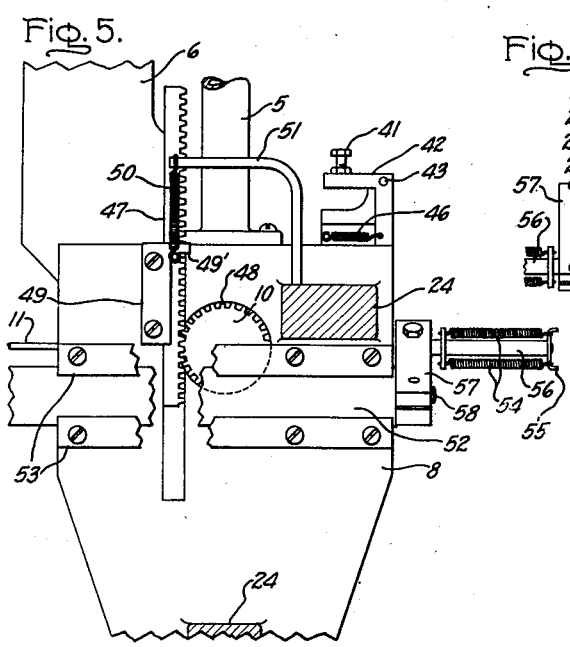
Figure 4:
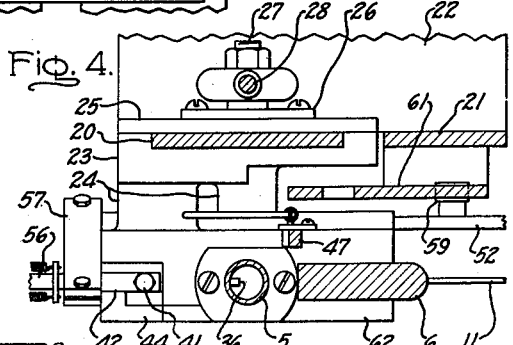

In the drawing, Fig. 1 is a front elevation of apparatus for feeding cylindrical glass bulbs, said apparatus being in the fully extended or delivery position; Fig. 2 is a corresponding side elevation at right angles to Fig. 1 of said apparatus; Fig. 3 is a front elevation of the control and orientation portion of the feeding apparatus in the retracted or recovery position and with portions broken away to show the feed channel through which the bulbs are advanced; Fig. 4 is a plan view of the control and orientation portions of the apparatus taken from a section therethrough between the arrows 4—4 of Fig. 2; and Fig. 5 is a back elevation of the control means of the apparatus taken from the dash-dot line 5—5 of Fig. 2 in the direction indicated.

The apparatus disclosed in the drawing is adapted to automatically feed cylindrical glass bulbs 1 from a hopper 2 to cavities in successive pairs of conveyor jaws 3 and 4 which are indexed into a receiving station some distance below said hopper 2. The cylindrical glass bulbs 1 are arranged haphazardly over the upper ends of the tube 5 and the agitator 6 extending through the bottom of the hopper 2 and are moved about by the constant upward and then downward movement of the tube 5 and agitator 6 so that they finally work into an end foremost position over the end of said tube 5 and pass down through the hollow interior thereof to the control and orientation means of the apparatus. The length of the tube 5 is such that a reserve supply of glass bulbs 1 is normally contained therein and no interruption occurs in the feeding cycle when the glass bulbs 1 do not pass regularly into the end of the tube 5.

In the normal operation of the apparatus a glass bulb 1 is released from the reserve in the tube 5 in each feeding cycle and allowed to fall from the lower end thereof to the channel 7 (Fig. 3) in the head 8 of the control and orientating means and then passes into the transverse passage or channel 9 in the spindle 10, which channel terminates against the wall of said body 8. The spindle 10 is immediately turned 90 degrees to arrange the channel 9 and the glass bulb 1 in a horizontal position in which the ends of said bulb 1 are opposite the push rods 11 and 12 and the upper ends of the branch channels 13 and 14 in the body 8 and the said bulb 1 is moved into one or the other of the branch channels 13 or 14 by movement of the push rods 11 and 12. The push rods 11 and 12 complete their cycle of operation and their function by rapidly moving alternately into said channel 9 and then back beyond the limits of the branch channels 13 and 14. If the glass bulb 1 is so positioned within the channel 9 that the open end is nearest push rod 11, the push rod 11 enters the open end of said bulb 1 and then moves back again without disturbing it and the subsequent motion of the push rod 12 carries said rod 12 against the closed end of said bulb 1 and pushes the said bulb 1 to the right (Fig. 3) from the channel 9 of the spindle 10 and into the branch channel 13. At the time of the above described movement of the glass bulb 1, the opposite push rod 11 moves back completely out of the branch channel 13 (Fig. 1) so that the glass bulb 1 is free to pass into said channel 13 and pass around the curve therein and then by gravity down through the lower portion thereof to the junction with the opposite branch channel 14. Should the glass bulb 1 be oppositely positioned so that the push rod 11 engages the closed end thereof, it is pushed thereby into the opposite branch channel 14 at a time when the push rod 12 is withdrawn therefrom and passes through said branch channel 14 to the junction with branch channel 13. In both conditions of operation the bulbs 1 are pushed open end foremost into the respective branch channels 13 and 14 and are therefore correspondingly positioned when arriving at the junction so as to be orientated in the same end-for-end position. The flat partition 15 is pivoted on a pin 15' extending from the body 8 and swings freely to either side as need be to allow a glass bulb 1 passing down either branch channel 13 or 14 to pass out the outlet opening in said body 8 to the discharge tube 16 and then to the discharge head 17 where it rests on the release finger 18.

During the orientation of the glass bulb 1 by the apparatus, the assembly comprised of the tube 5, body 8 and associated means is moving down and advancing the discharge head 17 into proper relation to a receiving station of a conveyor of associated apparatus which at the same time is advancing a pair of jaws 3 and 4 to the proper position at said receiving station. The movement of the assembly terminates when the discharge head 17 is directly over a cavity formed by matching semi-circular recesses or hollowed portions in the upper faces of the jaws 3 and 4 of the conveyor and is followed by movement of the release finger 18 which allows the glass bulb 1 within the discharge head 17 to fall open-end-first into said cavity. The entire assembly of the feeding apparatus then moves upward away from the conveyor leaving the glass bulb 1 resting on end at the base of the cavity in the conveyor jaws 3 and 4.

The succeeding movements of the conveyor index the jaws 3 and 4 and the bulb 1 out of the receiving station and advance an empty pair of jaws 3 and 4 into the receiving station. The succeeding movements of the feeding apparatus, on the other hand, are those of a succeeding cycle of operation like that outlined in feeding another glass bulb 1 to the receiving station.

Referring now to the details of construction of the apparatus disclosed in the drawing, the hopper 2 of the apparatus which is sufficiently large to hold a considerable quantity of the glass bulbs 1 and which is resupplied periodically by pouring additional quantities thereinto, is a stationary element mounted through an extending portion (not shown) at the base of the funnel shaped bottom thereof which enters into an opening in the horizontal bar 19. The further extent of the mounting for the hopper 2 comprises the vertically disposed support plate 20 and guide plate 21 the upper ends of which are fastened to the bar 19 and the frame 22 of the apparatus which is attached to the lower ends of the support and guide plates 20 and 21 and which is mounted on the machine (not shown) with which said apparatus is associated. Movement of the bulbs 1 from the hopper 5 is initiated by movement of both the feed tube 5 and the agitator 6, which extend upward through openings in the hopper 2 and which are attached at their lower ends to the head 8 of the control and orientating means of the apparatus, upward into the loosely arranged glass bulbs 1 and then downward again to the position shown in Fig. 1 in accord with corresponding movements of said head 8.

The movement of the feed tube 5 and the agitator 6 is in a vertical direction as the body 8 which is connected with but spaced from the slide 23 by the integral posts 24—24 follows the movement of said slide 23 along the guide plate 20 which it engages. A plate 25 attached to the slide 23 over the channel therein containing the guide plate 20 keeps said slide 23 in engagement with said guide plate 20. Said slide 23 is connected through the fastening 26 and pin 27 to the connecting rod 28 which is connected to the crank 29 whereby to convert the rotative motion of drive shaft 30 to the reciprocating motion of slide 23 and head 8. Shaft 30 is supported by a portion of the frame 22 of the apparatus and is driven from the main drive shaft 31 of the machine with which the feeding apparatus is associated through the chain 32 and sprockets 33 and 34. A counter-weighted end 35 of the crank 29 assists in neutralizing the effect of the weight of the slide 23 and the head 8 thereby assuring a smooth upward and downward reciprocation thereof with the single rotation of shaft 30 in each cycle of the operation thereof.

The glass bulbs 1 tend to align themselves with the open end of the feed tube 5 and pass end-foremost into said tube end and then by gravity down the length thereof to finally rest on preceding bulbs 1 therein or on the stop finger 36. Normally the feed tube 5 is completely filled with bulbs 1 but on occasion the bulbs 1 within the hopper 2 may be so arranged that feeding is momentarily interrupted. On such occasions those bulbs 1 within the tube 5 function as a reserve and prevent an interruption of the feeding operations of the apparatus.

When the cycle of operation raises the head 8 almost to the limit of its motion the feed tube 5 is positioned so that the roller 37 on the arm 38 extending from the stationary bar 19 passes into the opening or slot 39 in the feed tube 5 and bears against the glass bulb 1 in that particular part of the feed tube 5. The arm 38 pivots about a pin in the stationary bar 19 and is under the constant influence of a spring 40 which extends between fastenings thereon and keeps the roller 37 biased toward the feed tube 5. Prior to the alignment of the roller 37 with the opening 39 said roller 37 has no function and rides on the surface of the feed tube 5; however, alignment of said roller 37 and opening 39 causes it to bear against the particular bulb 1 exposed thereby with sufficient force to press said bulb 1 against the inside of the feed tube 5 and prevent it and the remaining reserve supply of bulb 1 resting thereon from movement through said feed tube 5. The roller 37 is part of an escapement means which retains the next to the lowermost bulb 1 of the reserve supply while said lowermost bulb 1 which is located in the feed channel 7 of the head 8 is caused to move independently, a movement which occurs when the upper limit of travel of the head 8 is completed and the stop finger 36 is withdrawn from its position below said lowermost bulb 1.

The operation of the stop finger 36 results, as shown in Fig. 3, from the engagement of the head of stud 41 on operating lever 42 with the bar 19, and swings said lever 42 about the pivot pin 43 supported by the bracket 44 extending from the head 8. A slot in the end of the lever 42 provides clearance for the pin 45 joining said lever 42 and stop finger 36 to compensate for their slightly different directions of movement, which provides for the release of separate bulbs 1 to the control and orientating means of the head 8. In the succeeding operations of the apparatus which lower the head 8 and the feed tube 5, the stud 41 moves away from the bar 19 and the contraction force of the spring 46 swings the lever 42 so as to advance the stop finger 36 again into position in the channel 7, and the opening 39 in the feed tube 5 moves out from under the roller 37 thereby releasing the reserve bulbs 1 in said tube 5 and again allowing them to move down into engagement with the stop finger 36. These cooperative functions of the roller 37 and stop finger 36 provide an escapement which releases a single bulb 1 from the reserve in each cycle of operation.

The course of movement of the bulb 1 from the channel 7 carries it into the transverse channel 9 in the spindle 10 while the head 8 is still at its upper limit of travel and thereby positions it within the orientating means of the apparatus which assures feeding of the bulb 1 in a desired end-for-end relation. At such times the spindle 10, which is rotatable within the head 8 and which is under the rotative influence of the rack 47 engaging teeth 48 (Fig. 5) on a portion of the spindle, is held in the position shown by the engagement of a portion of bar 19 with the top end of the rack 47. The immediate downward movement of the head 8 effects the operation of the orientation means by causing the spindle 10 and the bulb 1, which is wholly contained within the channel 9 thereof, to turn counter-clockwise (Figs. 1 and 3) until said bulb 1 and channel 9 lie in a horizontal position. The downward motion of the head 8 lowers the rack 47 which is slidable vertically in ways under retaining plate 49 in said head 8 and permits the biasing effect of the spring 50, which extends between a post in said rack 47 and a second post 51 in a portion 24 of the body 8, to move the said rack 47 to cause the rotation of spindle 10. The limit of motion of the rack 47 and the spindle 10 is reached when the spring post on rack 47 engages the shoulder 49' on the retaining plate 49. The bulb 1 then lies with its ends opposite corresponding push rods 11 and 12 and corresponding branch feed channels 13 and 14 of the orientation means and is pushed into one or the other of said channels 13 or 14, depending on its end-for-end relation, by alternate forward and then backward horizontal movements of said push rods 11 and 12.

Both push rods 11 and 12 are similarly mounted on opposite ends of a slide 52 located between gibs 53 attached to the head 8 and are moved in the same direction by said slide 52 except in instances of faulty operation when the spindle 10 is not turned to the proper position or when broken glass, etc., blocks the movement thereof. On occasion of faulty operation, the motion of the slide 52 is absorbed in expanding the springs 54 of the mounting for the push rods 11 and 12. The said mounting comprises separator links 55 attached to the outer ends of said rods 11 and 12 and coupled to and normally held against the ends of sleeves 56 by said springs. The said sleeves 56 provide support bearings for said push rods 11 and 12. Each mounting is completed by a fixed arm 57 clamped at one end to post 58 extending from the end of the slide 52 and clamped at its other end to sleeve 56.

The sequence of operations of the orientation means is such that the push rod 11 is advanced toward the bulb 1 by a movement of the slide 52 to the left (Figs. 1 and 3) which motion is effected in the course of the downward travel of the head 8 by the passage of the roller 59 on slide 52 from the vertical portion 60a of slot 60 in stationary cam 61 to the oblique portion 60b of said slot 60. The cam 61 is mounted through its ends on the support plate 21 and occupies a position between the head 8 and the slide 23. The motion of the push rod 11 advances it into the transverse channel 9 and, in the instance shown, into the open end of the bulb 1 and is terminated before said push rod 11 engages the closed end of said bulb 1. However, in other instances, the bulb 1 is oppositely arranged and the push rod 11 engages the closed end of said bulb 1 and pushes the said bulb 1 sufficiently for its momentum to carry it out of the channel 9 and into the branch feed channel 14. Push rod 12, having the same movement as push rod 11, is withdrawn from the branch feed channel 14 at the same time so that the bulb 1 is allowed to pass through the length thereof.

On completion of the forward movement of the push rod 11 an opposite and longer backward movement occurs therein brought about by the advance of roller 59 into an oppositely sloping oblique portion 60c of the cam slot 60 which movement removes the push rod 11 from the channel 9 in the spindle 10 and then withdraws it from branch feed channel 13. The course of the movement of the push rod 12 is just the opposite of that of push rod 11 and, in the present instance, causes it to engage the closed end of the bulb 1 and to push the bulb 1 into branch feed channel 13. The roller 59 finally enters the lower vertical portion 60d of slot 60 so that no further movement occurs in the push rods 11 and 12 in the downward motion of the head 8, and the bulb 1 formerly contained within the channel 9 in the spindle 10 is advancing through the apparatus in either branch feed channel 13 or 14 with the open end foremost and therefore in a fixed orientation.

Both branch channels 13 and 14 extend to a common outlet channel in the head 8 where a free swinging partition 15 separates one from the other so that the bulb 1, if it is passing through either branch channel 13 or 14, is prevented from entering the opposite branch channel 14 or 13 and merely pushes the partition 15 to one side and passes out the common outlet channel. A plate 62 attached to the face of the head 8 covers the open side of the feed channels 13 and 14 and other portions of the course of movement of the bulb 1 so as to restrict said bulb 1 to said course of movement.

The bulb 1 passes from the outlet channel of the head 8 to the discharge tube 16 attached thereto and then enters the discharge head 17 where it comes to rest on the end of the release finger 18 extending over the opening therein. Finally at the limit of movement of the head 8 in a downward direction, the discharge head 17 takes the position shown (Figs. 1 and 2) and is located directly above the means, the conveyor jaws 3 and 4 in this instance, that is to receive the bulb 1. The jaws 3 and 4 which are pivoted about the pin 63 present a shallow circular cavity of slightly larger size than the end of the bulb 1 and receive the lower open end of the bulb 1 which drops into said cavity and rests on the bottom thereof on being released from the discharge head 17 by movement of the release finger 18.

The operations of the apparatus effecting the release of the bulb 1 are brought about automatically by the movement of the arm 64 which is pivoted on the stud 65 extending from the support plate 21 so that the pin 66 in its end engages and turns the release lever 18 about the pin 67. A link 68 connects the arm 64 to an eccentrically positioned pin 69 on the end of the drive shaft 31 which pin 69 initiates the release of the bulb 1 by its course of movement. Because of the close proximity of the discharge head 17 and the conveyor jaws 3 and 4, the bulb 1 does not pass completely through said head 17 by the time it is seated in said jaws 3 and 4 and the said head 17 assists in retarding displacement of the bulb 1 caused by vibration, etc.

The upward return movement of the head 8 and associated apparatus occurs immediately after the release of the bulb 1 and causes a reverse sequence of operations that are useful in forcing the feed tube 5 and the agitator 6 up through the pile of bulbs 1 within the hopper 2 and in performing the operations already described of the succeeding cycle of operation.

What I claim as new and desire to secure by Letters Patent of the United States is:

1. In apparatus of the class described for orienting hollow cylindrical articles having one end thereof closed, the combination of means providing a pair of channels having adjacent and opposed upper ends and merging at their lower ends into a common outlet, means to receive and support one of said articles between and in alignment with the said upper ends of said channels but without regard to the direction in which the open end of said article faces, a pair of plungers of smaller size than the interior of said articles and mounted in opposing relationship adjacent to and in alignment with the upper ends of said channels, and means mounting said plungers for alternate movement through said channel ends and through a portion of the position occupied by an article in said support means whereby one of said plungers engages the adjacent closed end of said article to push it open-and-foremost into the opposed channel.

2. In apparatus of the class described for orienting hollow cylindrical articles having one end thereof closed, the combination of an orienting mechanism comprising means providing a pair of channels having adjacent and opposed upper ends and merging at their lower ends into a common outlet, means to receive and support one of said articles between and in alignment with the said upper ends of said channels but without regard to the direction in which the open end of said article faces, a pair of plungers of smaller size than the interior of said articles and mounted in opposing relationship adjacent to and in alignment with the upper ends of said channels, and means mounting said plungers for alternate movement through said channel ends and through a portion of the position occupied by an article in said support means whereby one of said plungers engages the adjacent closed end of said article to push it open-end-foremost into the opposed channel, and means mounting said orienting mechanism for movement bodily toward and away from a delivery position and including means to effect actuation of the said plungers by virtue of the movement of said orienting mechanism.

3. Apparatus for orienting hollow cylindrical articles having one end thereof closed, comprising a rotatable spindle having a transverse passage therein adapted to hold the article, means providing an inlet channel adjacent said spindle for directing the articles into said passage without regard to their orientation, means providing feed channels having opposed upper ends at opposite sides of said spindle and merging at their lower ends into a common discharge outlet, means for rotating said spindle from a position wherein the passage therein is aligned with said inlet channel to a position wherein it is aligned with the upper ends of said feed channels, opposed push rods mounted for movement through the upper ends of respective feed channels and through the adjacent ends of the said transverse passage in said spindle, and means for moving the push rods to alternately advance first one and then the other thereof into the transverse passage in said spindle so that one of said push rods engages the closed end of the article therein to push it into the opposite feed channel.

4. In apparatus for feeding hollow cylindrical articles having one end thereof closed, the combination of: orienting mechanism comprising a rotatable spindle having a transverse passage therein adapted to hold the article, means providing an inlet channel adjacent said spindle for directing the articles into said passage without regard to their orientation, means providing feed channels having opposed upper ends at opposite sides of said spindle and merging at their lower ends into a common discharge outlet, opposed push rods mounted for rectilinear movement through the upper ends of respective feed channels and through the adjacent ends of the transverse passage in said spindle; means mounting said orienting mechanism for movement bodily toward and away from a discharge position; and means actuated by the movement of the orienting mechanism for effecting a rotation of said spindle from a position wherein the transverse passage therein is aligned with said inlet channel to a position in which said passage and said article are aligned with the upper ends of said feed channels, and for further effecting the movement of said push rods to alternately advance first one and then the other thereof into the transverse passage in said spindle so that one of said push rods engages the closed end of the article therein to push it into the opposite feed channel.

5. Apparatus for feeding hollow cylindrical articles having one end thereof closed comprising a rotatable spindle having a transverse passage therein adapted to hold the article, means providing an inlet channel adjacent said spindle for directing the articles into said passage without regard to their orientation, means providing feed channels having opposed upper ends at opposite sides of said spindle and merging at their lower ends into a common discharge outlet, means for rotating said spindle from a position wherein the passage therein is aligned with said inlet channel to a position wherein it is aligned with the upper ends of said feed channels, opposed push rods mounted for rectilinear movement through the upper ends of respective feed channels and through the adjacent ends of the said transverse passage in the spindle, operating means for said push rods including a horizontal slide carrying said rods and supported by the means providing said feed channels and also including a cam mounted at a fixed position adjacent thereto and operatively connected to said slide to effect rectilinear reciprocating motion thereof, and means for moving the spindle, channel means, slide and push rods as a unit toward and away from a discharge position to effect a reciprocating motion of said slide and movement of the push rods advancing first one and then the other thereof into the transverse passage in said spindle so that one of said push rods engages the closed end of the article therein to push it into the opposite feed channel.

6. In apparatus for feeding hollow cylindrical articles having one end thereof closed, the combination of: support means; unitary structure on said support means comprising a rotatable spindle having a transverse passage therein adapted to hold the article, associated means adjacent said spindle providing a vertical channel above said spindle for conducting an article into the transverse passage therein, and means providing feed channels having opposed upper ends at opposite sides of said spindle and merging at their lower ends into a common discharge outlet, and opposed push rods mounted horizontally for rectilinear movement through the upper ends of respective feed channels and through the adjacent ends of the said spindle passage; means mounted on the said unitary structure for rotating the said spindle comprising a gear attached to said spindle, a vertically disposed rack slidably mounted on said unitary structure and meshing with the said gear, and means biasing the said rack for holding said spindle in a rotative position aligning the transverse passage therein with the said upper ends of said feed channels; means for vertically reciprocating the said unitary structure on its support means first in an upward direction to bring the said rack against a stationary portion of said support means to thereby rotate said gear and turn the spindle to a position aligning its transverse passage with the said vertical channel to allow the article to fall therein and then in a downward direction to allow the return of the spindle to a position aligning said transverse channel with the said upper ends of the feed channels and to position the outlet at a discharge position; and means actuated at the proper interval by the downward movement of the said unitary structure for effecting the movement of the said push rods to alternately advance first one and then the other thereof into the transverse passage in the spindle so that one of said push rods engages the closed end of the article therein to push it into the opposite feed channel.

HARRY L. LOUDEN.

REFERENCES CITED

The following references are of record in the file of this patent:

UNITED STATES PATENTS

| Number | Name | Date |
|---|---|---|
| 736,622 | Olin | Aug. 18, 1903 |
| 1,325,339 | Swasey | Dec. 16, 1919 |
| 2,137,173 | Mallory | Nov. 15, 1938 |
| 2,278,544 | Gaskill et al. | Apr. 7, 1942 |
| 2,410,037 | Abbott | Oct. 29, 1946 |

FOREIGN PATENTS

| Number | Country | Date |
|---|---|---|
| 608,732 | Germany | Jan. 30, 1935 |